(12) United States Patent
McNeill

(10) Patent No.: US 8,972,897 B2
(45) Date of Patent: Mar. 3, 2015

(54) INFORMATION PRESENTATION IN VIRTUAL 3D

(75) Inventor: David B. McNeill, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/570,270

(22) Filed: Aug. 9, 2012

(65) Prior Publication Data

US 2012/0304127 A1     Nov. 29, 2012

Related U.S. Application Data

(63) Continuation of application No. 12/560,259, filed on Sep. 15, 2009, now Pat. No. 8,271,905.

(51) Int. Cl.
*G06F 3/048* (2013.01)
*G06T 19/00* (2011.01)
*G06F 3/01* (2006.01)
*G06F 3/0481* (2013.01)

(52) U.S. Cl.
CPC ............ *G06T 19/003* (2013.01); *G06F 3/04815* (2013.01); *G06F 3/011* (2013.01)
USPC ............................. 715/848; 715/850; 715/851

(58) Field of Classification Search
CPC .............................................. A63F 2300/8082
USPC .................................................. 715/848–851
See application file for complete search history.

(56) References Cited

U.S. PATENT DOCUMENTS

| | | | |
|---|---|---|---|
| 4,078,860 A | 3/1978 | Globus et al. | |
| 7,065,553 B1 | 6/2006 | Chesley et al. | 709/205 |
| 7,886,799 B2 | 2/2011 | Bradley | 156/555 |
| 2003/0032479 A1 * | 2/2003 | LeMay et al. | 463/32 |
| 2003/0048291 A1 | 3/2003 | Dieberger | 345/732 |
| 2005/0099603 A1 | 5/2005 | Thomas et al. | 352/85 |
| 2006/0287058 A1 * | 12/2006 | Resnick et al. | 463/19 |
| 2007/0109296 A1 | 5/2007 | Sakagawa et al. | 345/419 |
| 2008/0147354 A1 | 6/2008 | Rowan et al. | 702/182 |
| 2008/0252637 A1 | 10/2008 | Berndt et al. | 345/419 |
| 2009/0063983 A1 | 3/2009 | Amidon et al. | 715/733 |
| 2009/0089684 A1 | 4/2009 | Boss et al. | 715/757 |
| 2009/0099919 A1 | 4/2009 | Schultheiss et al. | 705/14 |
| 2009/0106671 A1 | 4/2009 | Olson et al. | 715/757 |

(Continued)

OTHER PUBLICATIONS

Linden Lab; "How Meeting in Second Life Transformed IBM's Technology Elite into Virtual World Believers"; Case Study (c) 2009.

(Continued)

*Primary Examiner* — Tadeese Hailu
(74) *Attorney, Agent, or Firm* — Karl Otto Hesse; Edward J. Wixted, III

(57) ABSTRACT

A method, system and program product for assisting a presentation owner in creating and presenting information to audience users in a virtual 3D cyclorama-like environment. A presentation object tool provides behavior in the cyclorama object to assist the presentation owner in resolving graphic objects into the cyclorama and in placing information onto the graphic objects. The presenter object tool also provides behavior in the graphic objects to allow the presentation owner to expand a graphic object into a larger viewing size, to increment and decrement the placement of graphic objects within the cyclorama's presentation space, and to place an expanded graphic object into a home viewing position for presentation to audience users.

20 Claims, 9 Drawing Sheets

(56) References Cited

U.S. PATENT DOCUMENTS

| | | | |
|---|---|---|---|
| 2009/0113066 A1 | 4/2009 | Van Wie et al. | 709/231 |
| 2009/0125819 A1 | 5/2009 | Hamilton et al. | 715/757 |
| 2009/0235183 A1 | 9/2009 | Hamilton et al. | 715/757 |
| 2009/0254843 A1 | 10/2009 | Van Wie et al. | 715/757 |
| 2009/0271821 A1 | 10/2009 | Zalewski | 725/37 |
| 2009/0327899 A1 | 12/2009 | Bress et al. | 715/731 |
| 2010/0037147 A1 | 2/2010 | Champion et al. | 715/751 |
| 2010/0169837 A1 | 7/2010 | Hyndman | 715/848 |
| 2010/0257450 A1 | 10/2010 | Go et al. | 715/733 |
| 2010/0287510 A1 | 11/2010 | Cragun | 715/848 |
| 2010/0332980 A1 | 12/2010 | Sun et al. | 715/706 |
| 2010/0332998 A1 | 12/2010 | Sun et al. | 715/757 |
| 2011/0029885 A1 | 2/2011 | Camenisch et al. | 715/741 |
| 2011/0066928 A1 | 3/2011 | Karlsson | 715/202 |

OTHER PUBLICATIONS

Nicole Yankelovich, et al.; "Improving Virtual World Presentations"; <http://hcid.informatics.indiana.edu/cscw08/CSCW08_Workshop/VW-WorkshopPositionPaper-v2.pdf>.

Sean Fitzgerald; "Second Life as a presentation platform"; Nov. 27, 2007; <http://seanfitzgerald.wordpress.com/2007/11/27/second-life-as-a-presentation-platform/>.

Shimamura, et al.; "Construction and presentation of a virtual environment using panoramic stereo images of a real scene and computer graphics models".

"Pattern Recognition"; 2000 Proceedings; 15th International Conference on vol. 4; pp. 463-467; vol. 4.

* cited by examiner

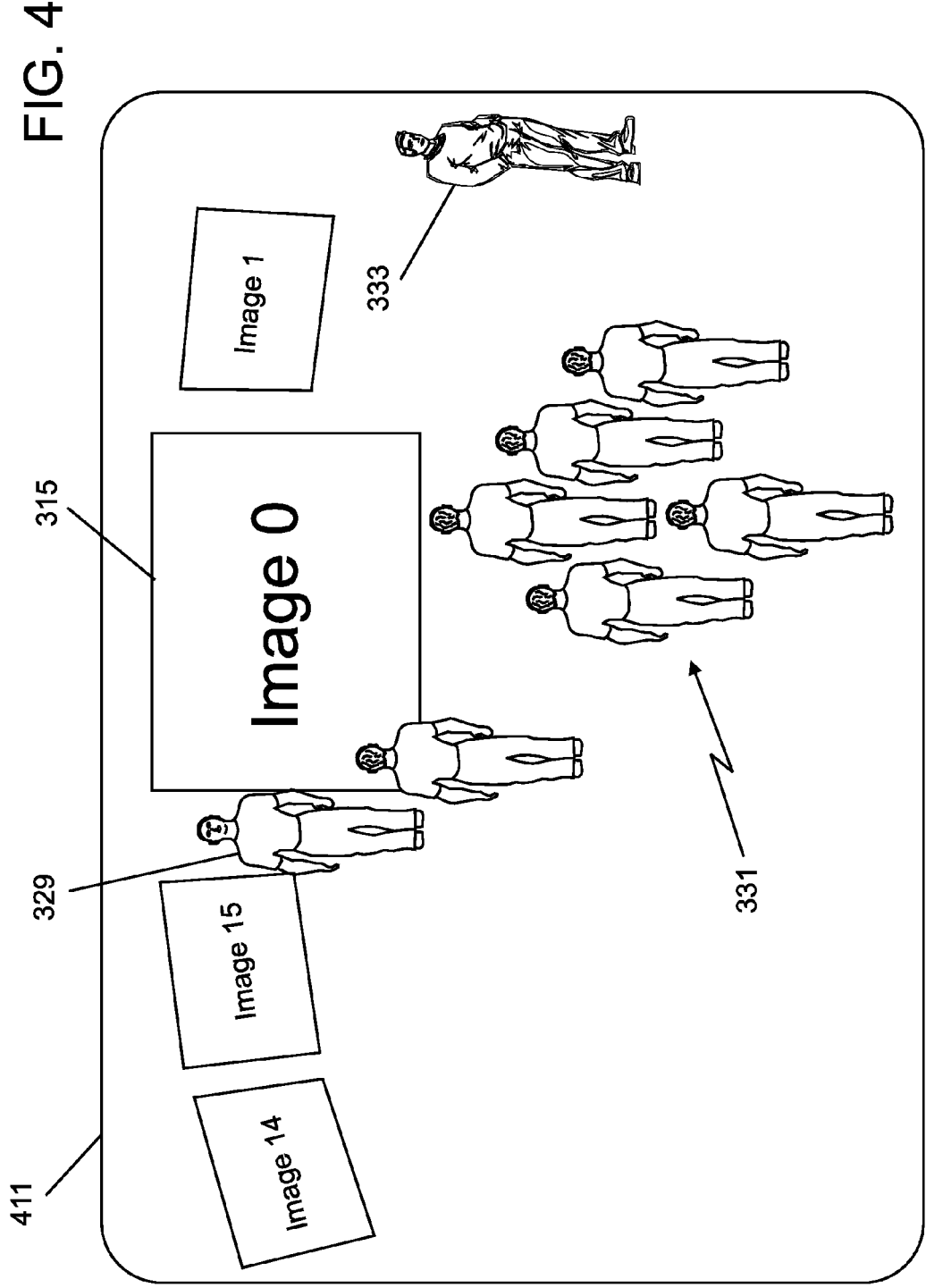

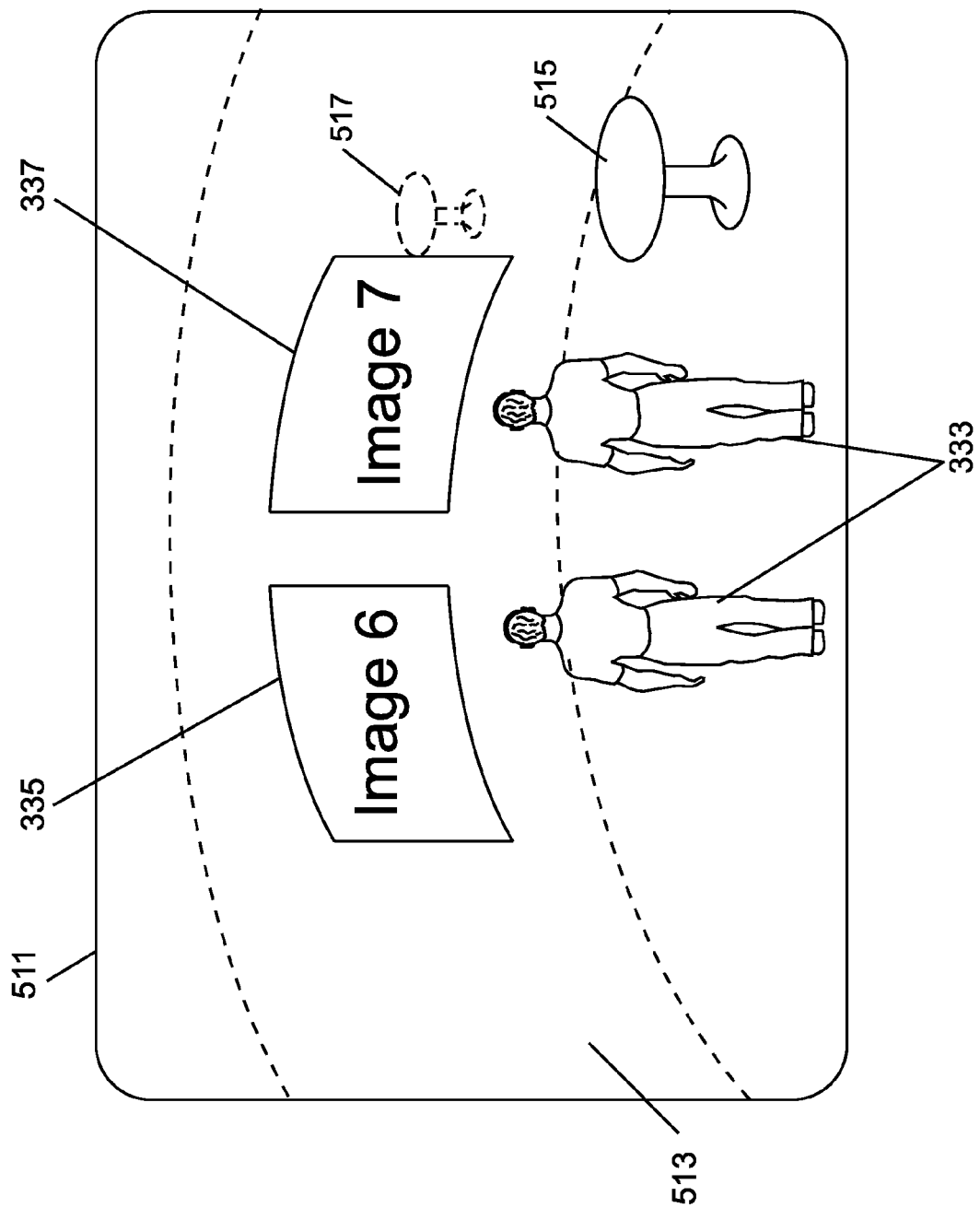

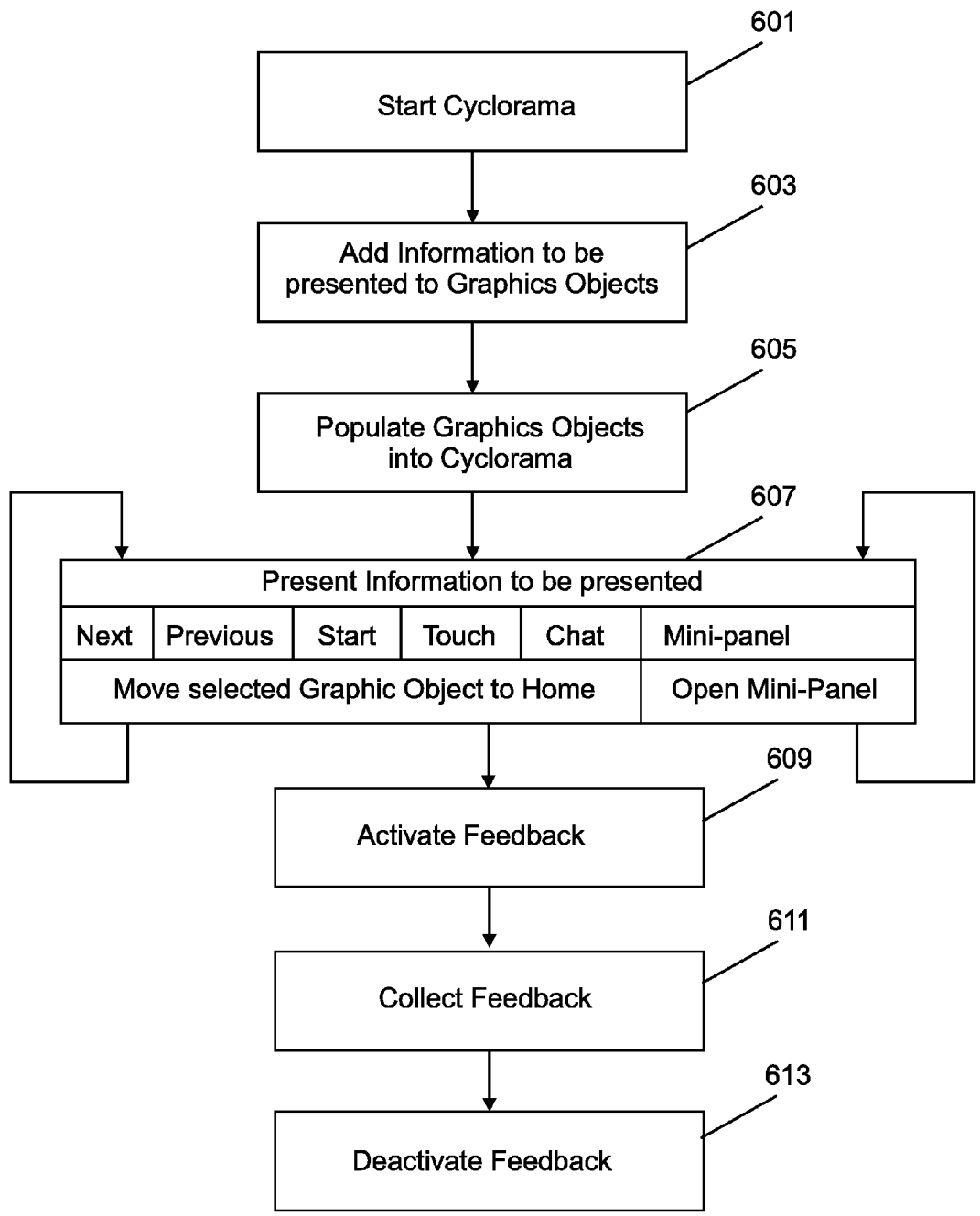

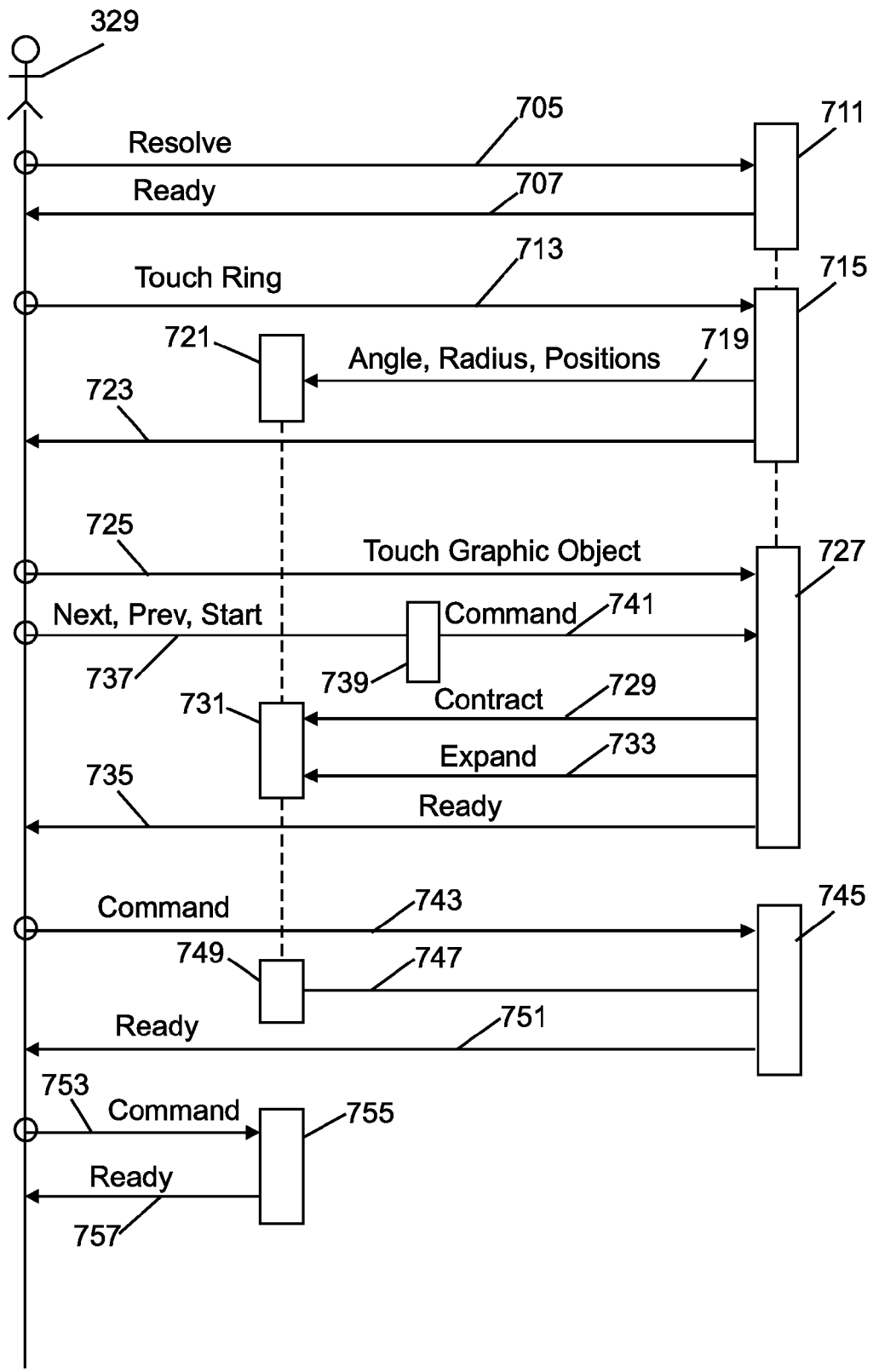

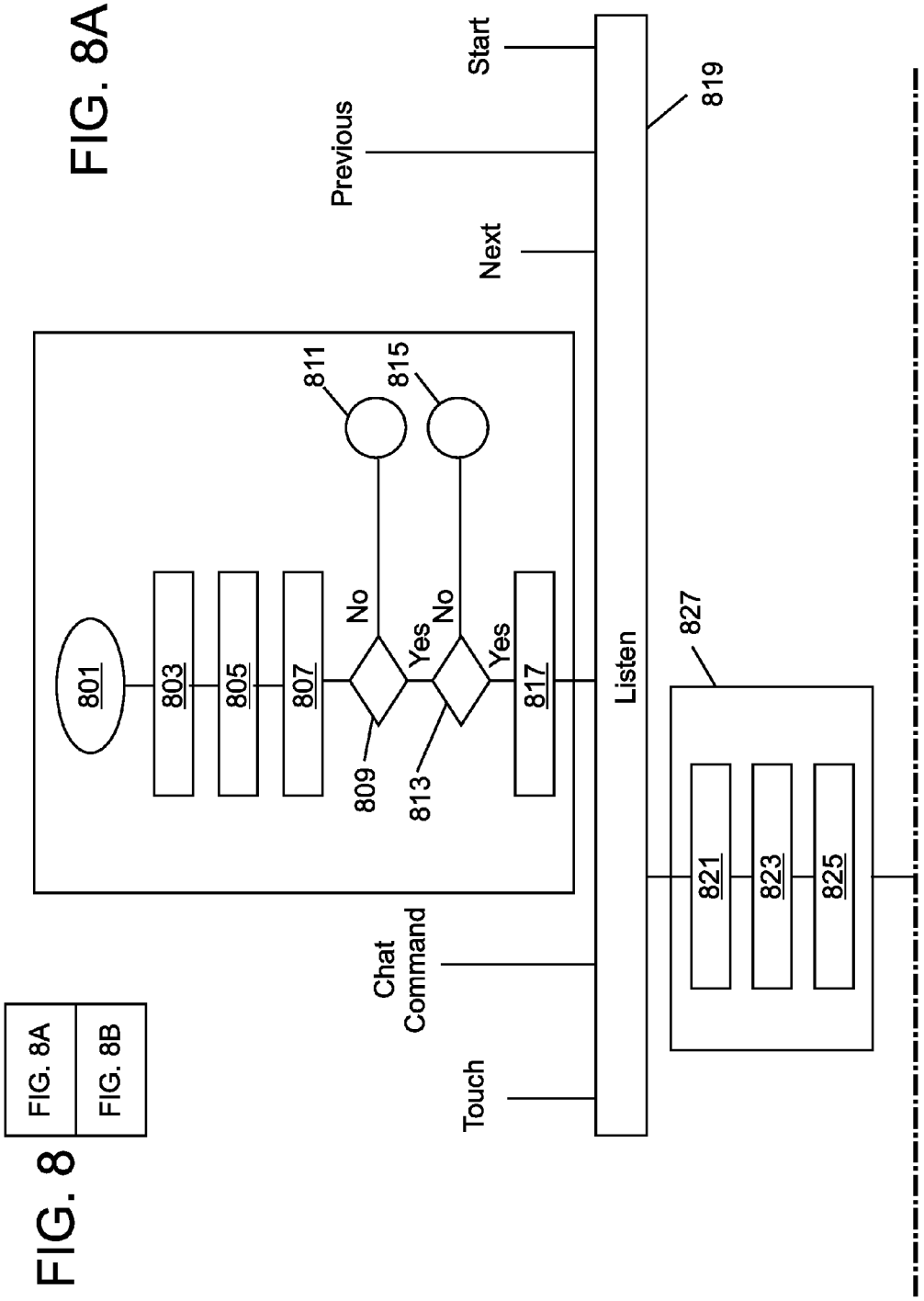

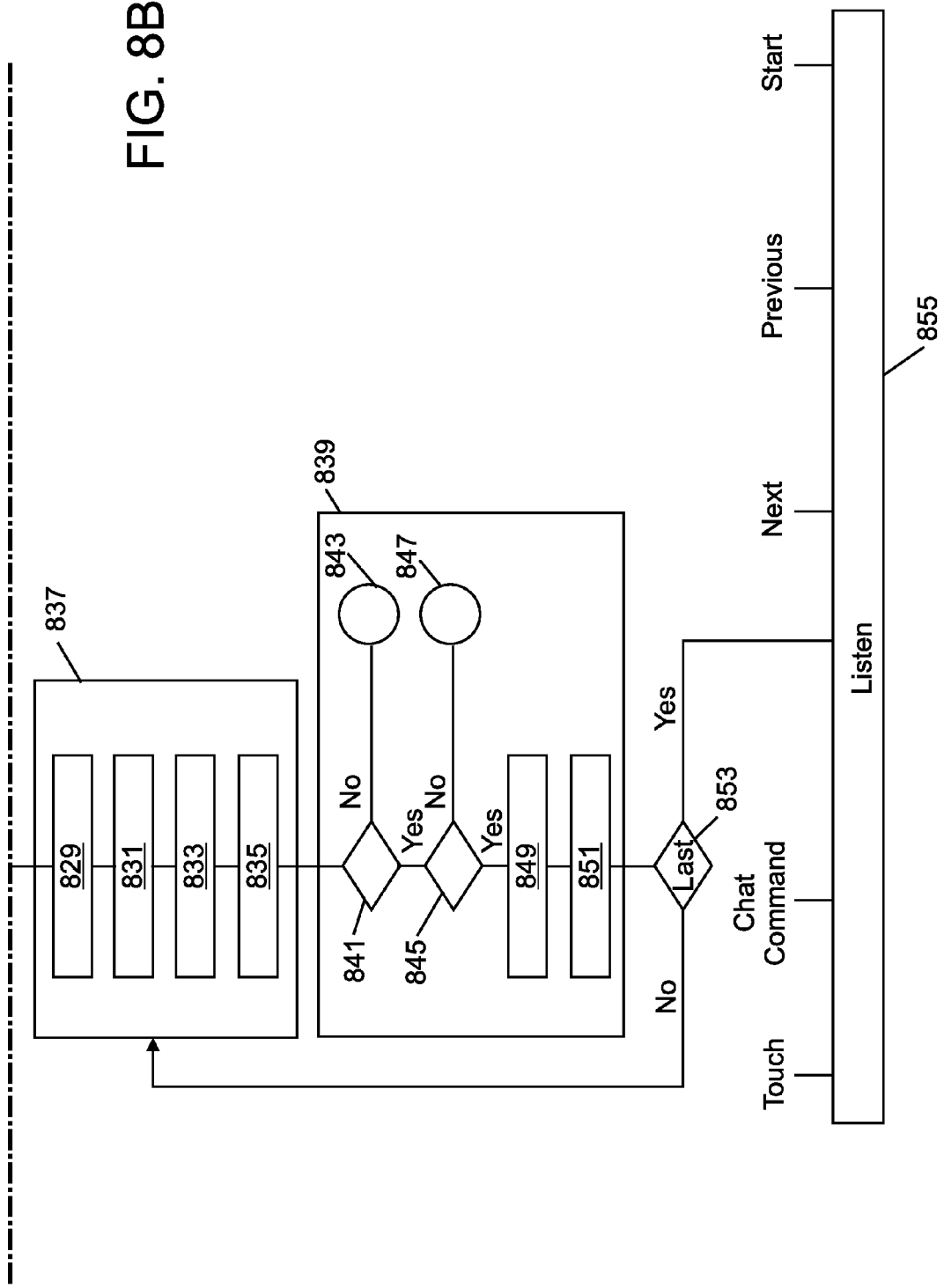

INFORMATION PRESENTATION IN VIRTUAL 3D

CROSS-REFERENCE TO RELATED APPLICATIONS

The present application is a continuation of application Ser. No. 12/560,259

BACKGROUND OF THE INVENTION

The instant invention relates to computer-implemented virtual environments where human participants are represented by avatars and, more specifically, to implementation of a programmed system for presenting information subject matter to an audience of computer users who may be physically dispersed around the real world.

BRIEF SUMMARY OF THE INVENTION

The instant invention provides a method, system, and program product uniquely adapted for ease of creating and controlling the presentation of information images by means of a computer network implemented virtual 3D environment to a widely-dispersed user audience using computers and network communication.

The invention simplifies resolving and managing images, such as lecture slides and product description data, within a virtual 3D environment that supports audience participation in a natural manner in that environment.

In a real-world museum-like space, an audience usually follows the presenter as a group around the room to view and examine 2D and 3D objects in that space. In the virtual 3D environment of the invention, the audience members have no cause for movement of their avatars nor for using camera control as the presentation owner moves from one image to another. In the instant invention, the virtual 3D presentation environment rotates around the audience under the control of the presentation owner to present the image serving as the current topic in the presentation at a home position. The presentation owner retains a substantial measure of control of the attention of the audience, while the audience members retain independence of movement and camera control to view information most of interest to them at any particular point in the duration of time the presentation images are available. Presentation duration time is also under the control of the presentation owner.

In one embodiment of the invention, information images are presented on computer display screens as textures accompanying a cyclorama-like series of TV screen-like graphic objects distributed evenly around the inner perimeter of a cylindrical-walled space in a 3D virtual world. The presentation owner has access to an additional copy of the current information being presented. Therefore the avatar of the presentation owner can face the audience yet still see the subject matter being presented.

By defining one or more ready-programmed virtual 3D presentation environments, the users of the system need not perform any of the usual time-consuming and often difficult graphic objects building using primitives such as cubes, pyramids and spheres, nor any of the attendant programming tasks usually required to achieve object movement and response to interactions in 3D virtual settings. Instead, only simple actions and commands to resolve the presentation environment and to add information from text processing or portable document format files to the system are needed.

In another embodiment, the virtual 3D space created on computer display screens, in which the presentation owner and the user audience are portrayed as avatars, is a semi-cylinder, and the TV screen-like graphic objects containing the presentation content are arranged in partial circle to the front of audience users, so that all or a substantial portion of the images being presented can be visually available by means of camera vision directed at substantially normal angles to the semi-cylindrical containing space, or to other images, not at substantially normal angles to the semi-cylindrical containing space, by the means of independent avatar movement and/or camera control on the parts of the individual audience users. In this embodiment, as the presentation images are incremented by the presentation owner, an end image at the left-hand end of the audience of users jumps to the end position of the images at the right-hand end of the audience of users.

Each member of the participating user audience has a large part of the information always available for reference by using avatar movement and/or the camera control features of the viewer application that provides the user with visibility into the 3D virtual world; hence, the user is not limited to the material being currently presented by the owner of the presentation.

BRIEF DESCRIPTION OF THE DRAWINGS

FIG. 4 is a perspective view on a computer display screen being seen by an audience member in using the invention.

FIG. 5 is a perspective view on a computer display screen being seen by an audience member who is not watching the expanded image being currently presented at a home position, but who has used avatar movement and/or camera control to view another image of the presentation.

FIG. 6 is a block diagram showing interaction of the presentation owner with the participating computers according to the method of the invention.

FIG. 7 is an interaction diagram showing message flow and response according to the method of the invention.

FIG. 8 shows how FIGS. 8A and 8B are connected.

FIGS. 8A and 8B show a more detailed block diagram of the first three blocks of FIG. 6, showing the interaction of the presentation owner with the cyclorama presenter object tool of FIG. 6 according to the method of the invention.

DETAILED DESCRIPTION

Figure 1:
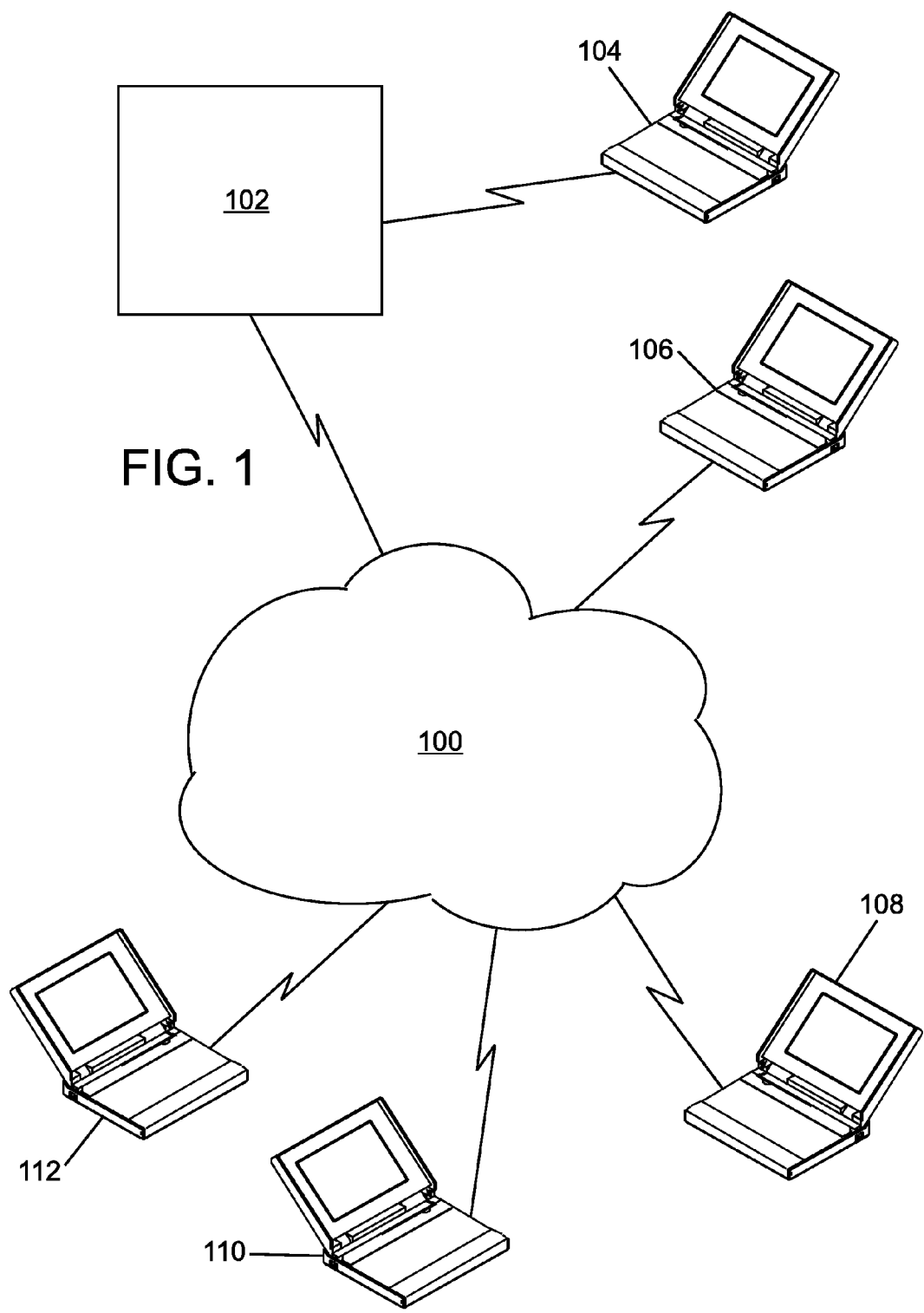
FIG. 1 is a block diagram illustrating a wide area network in which the instant invention finds utility.

One embodiment of the invention provides a simplified system and method for presenting information as textures on a cyclorama-like series of virtual TV screen graphic objects surrounding a virtual 3D space, all displayed on a computer display screen's view of a particular locality in a 3D virtual world wherein the defined virtual 3D cyclorama environment of the instant invention has been placed for operation.

As used in this detailed description, "3D" does not mean binocular vision. "3D" in this description means the effective use of the 3D environment of a virtual world, where things can be done that are not possible or would be prohibitively expensive in the real world. When an individual is using or experiencing a virtual world, that person is in effect carrying around a virtual camera in that virtual world. The camera is, by default, attached to a visual representation of that person; such visual representation is called an avatar. The camera gives a moving, changing image of the current moment's perspective in the virtual space in which that individual's avatar is currently situated. The human mind easily translates this acceptably real-looking virtual 3D space into an actual and legitimate experience, almost as real as walking about and having a similar experience in the real world. However, the virtual world experience still appears different enough from the real-world experience for the human users using it to readily accept that the virtual experience will not necessarily be encumbered by all the normal constraints of the real world. Additionally, virtual world experiences usually provide some means of communication for avatars, and hence for their real-life users, that are inhabiting the virtual world. Local chat and direct inter-avatar communications capabilities, allowing communication both in typewritten and audible forms, are typical on current 3D virtual world platforms.

In some virtual 3D environments, primitive graphic objects may be combined into larger and usually more complex graphic objects and thereafter manipulated, both through human control or through the operation of scripts that are part of the virtual world's implementation. Scripts are independent blocks containing programming code and local data and global data. Scripts are attached to and/or embedded within graphic objects and impart behaviors to them, including the ability to communicate with each other and with avatars or other free agents in the 3D virtual world. Scripts have states; and an instance of a script normally exists in a single state at any point in time. States are composed of events. The nominal use of scripts in 3D virtual worlds is to impose some entity-state model on one or more graphic objects. Graphic objects may thereby be created and manipulated and be responsive to the event handlers in the scripts associated with those graphic objects. In addition, the surface appearances of graphic objects can be independently defined graphic objects called textures. In some virtual world implementations, scripts can be used to control many attributes of graphic objects, including the textures that are placed accompanying their surfaces.

Referring to the drawings, and first to FIG. 1, the present invention is embodied in a network shown in block diagram form that includes server blocks and client blocks operating in a wide area network. A 3D virtual environment system control program, such as Second Life™, runs in the server computer 102 to create, contain, and manage a virtual manifestation of a 3D environment. A viewer application that displays the virtual manifestation, allows the user to visually and audibly enter into and dwell in, and perhaps manipulate that virtual environment, runs in each of the client computers 104, 106, 108, 110, and 112. In the case of the instant invention, the viewer application is considered to be showing that portion of the 3D virtual world wherein the presenter (presentation owner) is using the invention to offer a presentation to other individuals, who are also users of that 3D virtual world and who have their respective viewers substantially collocated in virtual space and time with the presenter's view of the virtual world. Any one of these computers may be the one used by the presentation owner who controls the information content and sequencing of the presentation and who also controls which graphic object is made the presentation graphic object by enlargement to a more central and prominent home position on all of the computer displays, by means of the cyclorama handler in the program product of the invention.

Figure 2:
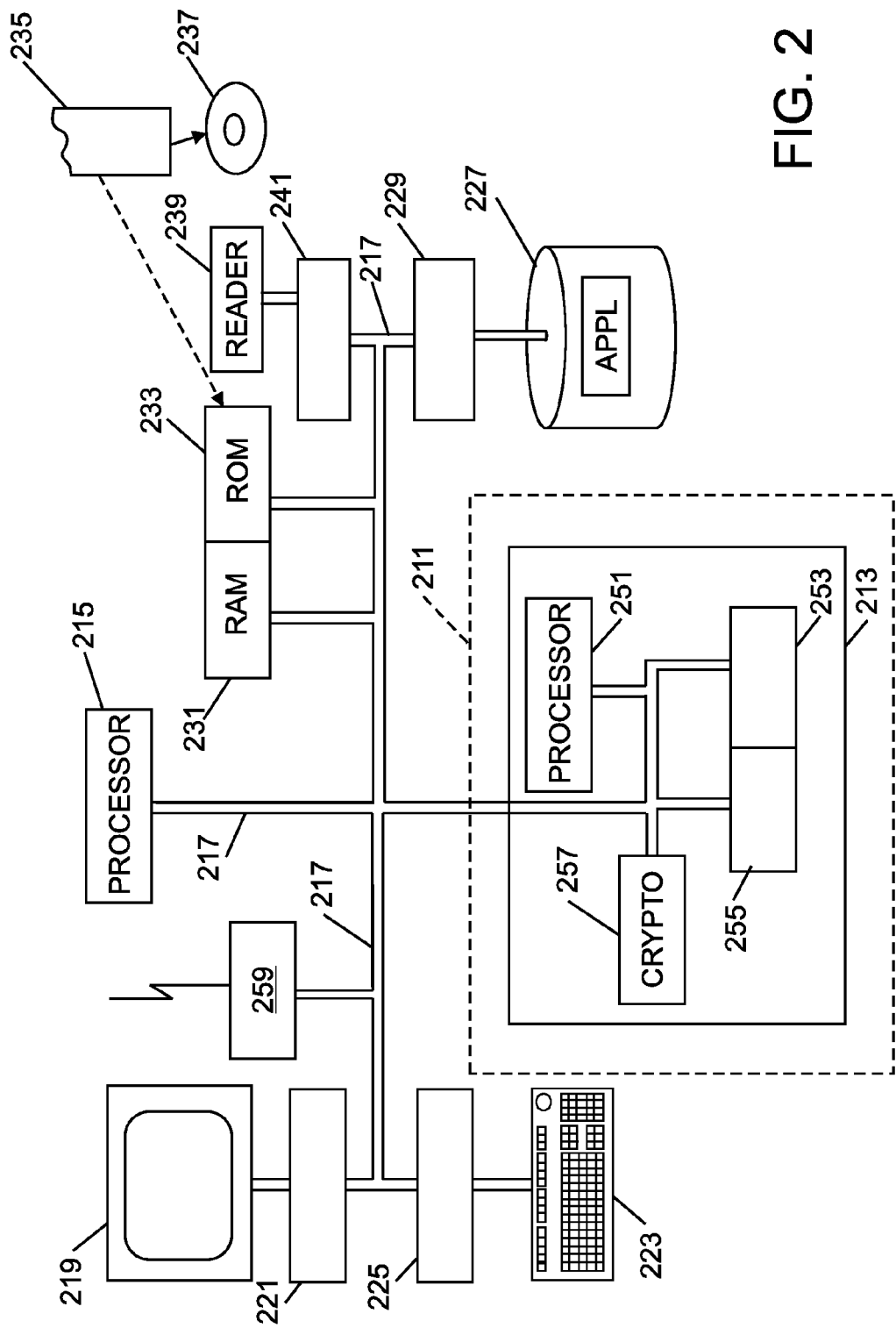
FIG. 2 is a block diagram of a computer which is used to implement the computers shown in the diagram of FIG. 1.

FIG. 2 is a block diagram of a computer that may be used to embody the computers 102, 104, 106, 108, 110 and 112. For the purpose of describing the present invention in the context of the preferred embodiment, a typical computer architecture is shown, which represents a configuration used in many personal computers at client sites and FIG. 2 is also representative of a server computer and a database computer such as 102.

A processor 215 is connected to a bus 217 which comprises a set of data lines, a set of address lines and a set of control lines. A plurality of I/O devices including memory and storage devices are connected to the bus 217 through separate adapters. The I/O devices may be standard features of the computer, or plug-in options. For example, these devices may include a display 219 connected through a graphics adapter 221, a keyboard 223 connected through an adapter 225 and a hard disk drive 227 connected through adapter 229. The other devices are either included as part of the computer or are available as plug-in options. The random access memory (RAM) 231 and the read-only memory (ROM) 233 are included as standard equipment in a computer, although additional random access memory to supplement RAM 231 may be added via a plug-in memory expansion option.

As shown in FIG. 2, computer program logic 235 implementing the method and presenter object tool of the invention, which is shown in the remaining drawings, is embodied as an article of manufacture by embedding the computer logic into compact disc 237, or other portable storage media including the communication of stored computer program logic via a communication medium such as the internet 100 which is connected through adapter 259. Media 237 can be read by reader 239 connected to bus 217 by adapter 241. Further, the computer program logic 235 may be embodied as a special purpose apparatus by storing the computer logic's executable instructions in RAM 231, ROM 233, or a combination of both and or in DASD 227, accessible by the processor 215 via adapter 229, for execution by processor 215.

In addition to use with the main processor 215, portions of the logic of the invention may be advantageously employed in special purpose devices such as the co-processor card 211 which is connected to bus 217. Co-processor card 211 may be a graphics processor to expedite combining and manipulating graphic objects in the 3D viewer application. Again the computer logic 235 embodying the method of the invention may be implemented as a special purpose apparatus by storing the computer program logic's executable instructions in RAM 253, ROM 255, or a combination of both and/or loaded into RAM 253 from DASD 227 as described above. Exemplary co-processor 211 also contains a cryptographic processing module 257 for efficiently executing algorithms such as the Data Encryption Standard (DES) algorithm and the Rivest Shamir & Adleman (RSA) algorithm as examples of available algorithms which can be used to verify the authenticity of users and downloaded applications.

Webster's New Collegiate Dictionary describes the word cyclorama as "1: A large pictorial representation encircling the spectator and often having real objects in the foreground; 2: a curved cloth or wall used as a background of a stage set to suggest unlimited space." The virtual 3D presentation space created by the instant invention, being similar to a classic cyclorama, will be called a cyclorama hereinafter in describing this embodiment of the invention. It will be recognized that the virtual 3D space being occupied need not literally be cylindrical, but also may be a another hollow polygonal or conical enclosure of a virtual space, or any portion thereof, without departing from the invention.

Depending upon the camera angle of a participating user, the information displayed on the expanded image at the home position may be visible directly in front of, on a more edge-on view, or to the rear view of and therefore out of view to the participating user. This notion is shown in greater detail in FIG. 3 which gives more of a bird's eye view declination, showing the back side of the graphic object at home position 315 and the views of many of the audience avatars, wherein they are facing the expanded cyclorama graphic object in the home presentation location 315. The presentation owner's avatar 329 is shown standing at the side of the expanded image of the graphic object at home position 315. Without exercising independent camera control, the presentation owner cannot see the image on the expanded cyclorama graphic object at home position directly on the computer display 311. To aid the presenter, a mini-panel selector button 317 opens a mini-panel 321 which shows a copy of the same image texture as is on the expanded cyclorama presentation graphic object at 315 obviating the implied need for the presentation owner to change his camera view away from the collected avatar audience. The mini-panel also allows the presentation owner to use the pointing cursor of the computer to point to particular elements of information on the second smaller image, which pointing is subsequently highlighted on the expanded cyclorama graphic object at home position and therefore relayed to all other users on their computer displays by virtue of the underlying virtual world implementation.

In this embodiment of the invention, cyclorama graphic objects are expanded and contracted as they are rotated about the audience avatars occupying the space inside the cyclorama during a presentation. In game applications, there is little need to expand or contract a graphic object because camera control on the part of the user is expected as the user navigates an avatar in the game's 3D virtual world; such use of camera control is, in effect, part of playing such games. Because of the dynamic nature of the cyclorama system, expanding at least the image portion of a graphic object to a conveniently large size for viewing while keeping the other graphic objects present but smaller, there is no implicit need for an audience member to use avatar movement or independent camera control to follow along with the presentation content as offered by the presenter.

FIG. 4 depicts the default camera angle for the average audience user, showing that the full image of the expanded cyclorama graphic object at home position being presented by the owner is conspicuously distinctive as the current image, relative to the other presentation images, still present but whose graphic objects are not expanded. As shown in FIG. 5, an audience member user can use avatar movement or camera control to change the camera view to allow close- or wide-angle view of any cyclorama graphic object or to a set of adjacent cyclorama graphic objects. The changed avatar position of an audience member is dynamically shown on other users' computer displays by virtue of the underlying 3D virtual world environment. Therefore, other users, and particularly the presenter, are provided with feedback and are aware of audience attention to particular images in the presentation.

Architecturally, in this Second Life™ virtual 3D environment computer application embodiment of the virtual 3D environment, the cyclorama presenter object tool of the invention is assumed to be an avatar owned as contrasted with collectively owned object. Therefore, the cyclorama will operate correctly in locations in Second Life where the owner has build rights and script execution rights, because it must generate, link, and distribute its cyclorama graphic objects.

Figure 3:
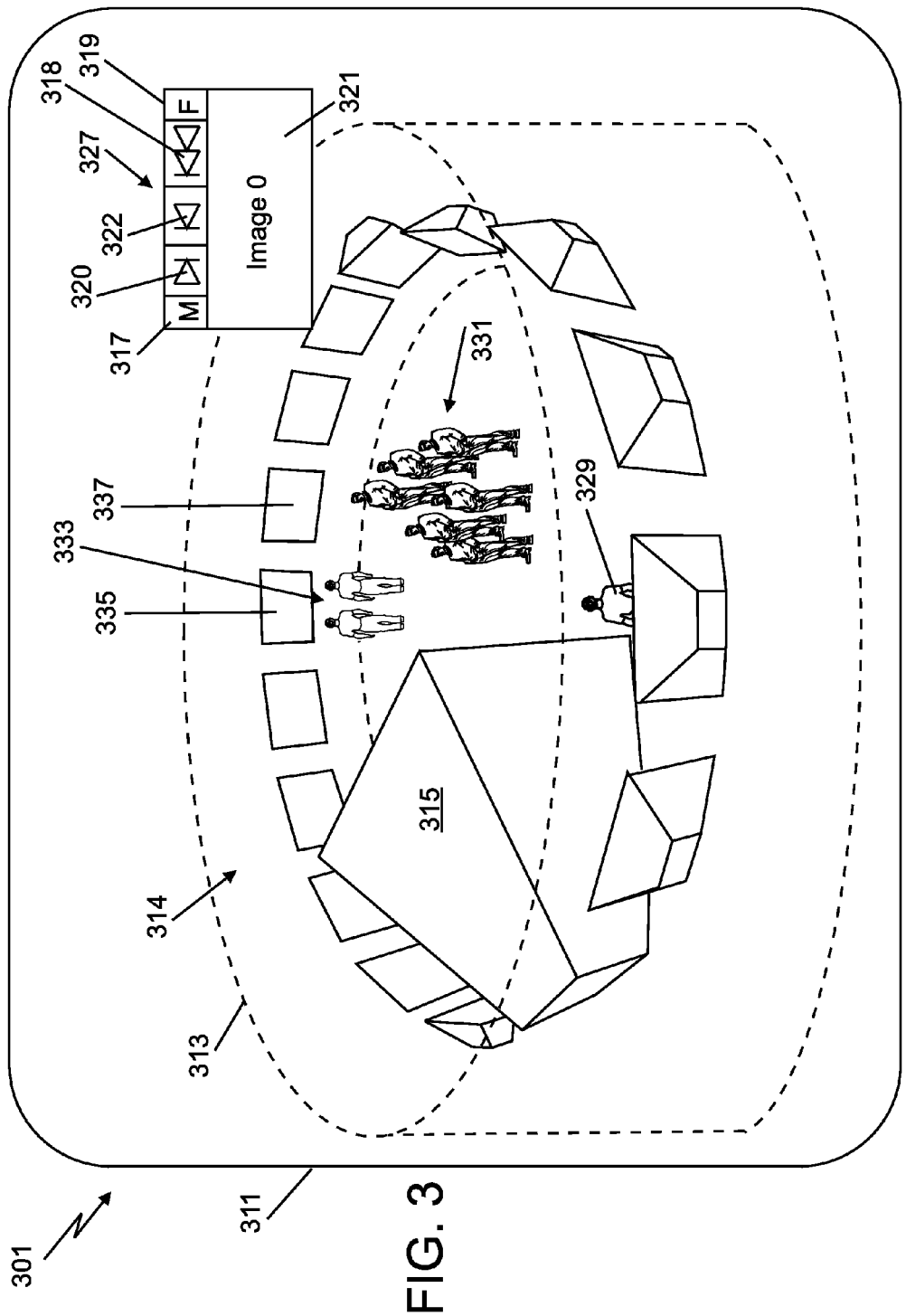
FIG. 3 is a perspective view on a computer display screen seen by a presenter when using the invention.

FIG. 3 at 301 illustrates the primary components of the cyclorama's virtual 3D presentation environment of graphic objects. 311 is the computer display, and it represents a view into that portion of the virtual world where the presentation experience is being given by the presentation owner. 313 is the hollow cylindrical cyclorama wall-like ring creating enclosed space 314. As shown in FIG. 7, the cyclorama presenter script program includes the re-entrant cyclorama handler 711, 715, 727, and 745. The cyclorama presenter script program also includes the cyclorama graphic object handler 721, 731, 749, 755 and the heads-up display handler 739 which is used by the presentation owner to start, advance, or review graphic object images. The cyclorama system, in its final configuration for presentation, will also contain the image textures that are to be presented.

Design-wise, the cyclorama itself consists of only two graphic object components: the hollow cylindrical cyclorama object and the cyclorama graphic objects. The graphic object template for the cyclorama graphic objects is an element of the inventory accessible to the cyclorama handler, along with the cyclorama's presenter script program, the command script program, and the information image textures that the cyclorama is to present. This form of packaging makes the sharing and distribution of the cyclorama virtual environment straightforward and easily managed.

The virtual 3D presentation environment 301 surrounds the virtual avatar audience in a hollow space, as depicted by the hollow cylindrical ring 313. The presentation information content, assumed to be static images, is then placed onto the inward-facing surfaces of a collection of graphic objects. Although static images have been assumed, and substantially planar surfaces are shown, it is within the skill of the art to present video images, and on non-planar surfaces, of the graphic objects without departing from the invention. Further, for purposes of simplifying the drawings, the graphic objects are shown as trapezoidal prisms resembling a TV screen. It will be understood that a simple two dimensional image graphic object as well as other complex graphic objects such as automobiles, rail cars, and so forth including the tables 515 and 517 of FIG. 5 can be defined for selecting and placing at 603 and 605 in FIG. 6 as the graphic objects carrying the presentation information with them on their surfaces as the cyclorama operates. Graphic object table 515 has been selected and placed into the midst of avatars 333. In the event that such complex graphic objects are utilized, additional virtual 3D presentation environments such as a race track or a railroad in addition to the wall-like enclosure may be defined. These additional virtual 3D presentation environments are then available for selecting and placing at 601 as the defined virtual 3D cyclorama environment into the Second Life™ virtual 3D environment as the invention is started.

The cyclorama graphic objects are placed around the inner circumference of the hollow ring at equal angular displacements from each other, as exemplified by the images at 335 and 337. Once the presentation content is built, then the current image 315, at the home position, expands inwardly into the ring to a comfortable size for the user audience to easily view and read the presentation image on their respective client computer displays. When the presentation owner 329 needs to change to a start image or to the next or previous image sequentially, the presentation owner can select the start 318 or either the next 320 or previous 322 buttons, respectively, on the heads-up display 327. The cyclorama's response is to: (1) reduce the size of the expanded cyclorama graphic object in the home position to its normal size, matching that of the other cyclorama graphic objects; (2) rotate the cyclorama ring 313 around the audience, carrying all the placed cyclorama graphic objects with it, so as to position the selected graphic object into the home position; and (3) expand the image carrying graphic object now in the home position to its fuller viewing size. Apart from allowing the audience to largely remain attentive to the home position for the current presentation topic, this method visually establishes a new expanded graphic object 315. This cycle repeats as sequential images are requested by the presentation owner or by one of the audience users, such as during a question-and-answer session.

Unique in the cyclorama system is that, unlike with typical current 2D presentation devices, substantially the entirety of the presentation is available all at once and continuously after the cyclorama has dynamically built the presentation, because the audience can be present within the volume of 3D space inside the presentation system.

The effect of having all presentation content continuously available can be seen in the sequence of FIG. 4 and FIG. 5. FIG. 4 shows one of the group of two audience users 333 congregated at the image at 335. In FIG. 5, the two avatar members 333 of the user audience are fully shown congregated at the specific graphic objects 335 and 337, which have image 6 and image 7 textures, respectively. Thus, each user has the flexibility, by using avatar movement and/or independent camera control, to focus on any of the presentation images, while not interrupting the main presentation flow, yet allowing the presenter to be aware that audience interest might not be concentrated on the material currently being presented when a large number of the audience avatars are so congregated. With the spatial awareness that audience interest might lie elsewhere, the presenter can freely move to the content most of interest to the audience, moving quickly to later material or back to previous material, as appropriate. The small window 327 has the next, previous, and start buttons to assist in accomplishing these moves.

This feature of the presentation environment of the invention is a major improvement over 2D presentation systems, even those 2D presentations being delivered using a virtual 3D environment, because, in 2D methods, usually only one image is displayed at a given time; and changing away from the intended topic or altering the sequence and flow of images is, as a rule, disruptive and disconcerting to both the presenter and the audience. In the cyclorama presentation environment of the instant invention, audience users can read or intensively study any image or set of images of the presentation at any time while the presentation owner retains control of the presentation by means of motion to and expansion of presentation information at the home position.

FIG. 5 shows how an audience subgroup can collaborate without introducing cacophony into the common chat or voice communications channels. FIG. 5 is a perspective camera view of the image seen by the two users 333 who are not watching the expanded image zero on presentation graphic object 315 at the home position being currently presented but are reviewing image 6 and/or image 7 on graphic objects 335 and 337. The computer display 511 shows the cyclorama ring 513 and the graphic objects 335 and 337. FIG. 5 also shows how audience users can at will, walk, navigate, or point to any graphic object of the presentation at any time. A subgroup of audience users as represented by their avatars can move to study, in close proximity, a particular image or set of images and, using chat or other collaboration features of the virtual 3D environment, can engage in real-time dialogue about that set without disrupting the remaining audience. Hence, a real-time collaboration about various images or subsets of images in the presentation can occur without having to fragment the audience or send working groups elsewhere. These kinds of interactions are not generally possible in real-world presentation venues; but they are immediately available, for no incremental cost, in a 3D virtual world.

FIG. 5 also shows that the virtual 3D cyclorama environment presentation wall 513 can have any texture, including a translucent texture. Further, the virtual 3D cyclorama environment can be placed into an already existing virtual 3D setting, such as a classroom, auditorium, or coffee shop. Illustrative examples in FIG. 5 are coffee table 515, located within the enclosed space of the cyclorama, and coffee table 517 outside the translucent cyclorama ring.

Operation of the Invention

The method of the invention as implemented in Second Life™ requires three steps. (1) Resolve the virtual 3D presentation environment which in this embodiment is a cyclorama ring by deploying it into the 3D virtual world. (2) Populate the cyclorama ring's accessible inventory with the image data, generally called textures, that are to constitute the presentation. (3) Touch the cyclorama ring to generate and render the presentation.

In this Second Life embodiment, the ordering of the images is by their lexicographic alphabetical ordering, so naming of the textures is important. Most programs that generate sequences of image files like JPEG and PNG files will automatically name a collection of separate images with some numerical sequencer in the names of the separate files. Hence, managing the names of the image files is not usually a problem if the images are generated automatically from a multiple page presentation or image sequence. The owner will generally need only to bulk upload the images from the owner's client computer platform into inventory in Second Life to gather all the needed images for populating the cyclorama.

FIG. 6 summarizes the method and operation of the instant invention. Block 603 denotes populating the cyclorama handler's accessible inventory with the textures constituting the presentation content. To populate the cyclorama with image data for the presentation, the owner places image textures from an inventory of text processing and portable document format files into an inventory of textures accessible to the cyclorama handler. The presentation owner would copy textures to the inventory of the cyclorama ring, from which the textures are then available to the scripts also in the inventory of the cyclorama ring. Copying is accomplished by right-clicking the ring, and then selecting Edit on the menu. On the untitled Edit window that appears, select the Content tab. Select in inventory all textures that need to be placed in the ring's contents. Then drag any selected texture by name from the inventory list to the container area of the Contents tab.

Block 601 denotes deployment of the cyclorama through the deployment mechanism of the underlying 3D virtual world. For example, the cyclorama owner deploys the cyclorama in Second Life™ by dragging it onto the virtual world's ground, or other available open surface, from the owner's inventory. The virtual world's ground may include an already present environment such as a coffee shop or an auditorium.

Block 605 denotes initiation of the cyclorama's self-building process by means of touching the cyclorama ring. The cyclorama handler responds by cyclically, for each texture copied at 603: (1) generating a new cyclorama graphic object; (2) optionally resizing the cyclorama graphic object so that all generated presentation graphic objects will fit within the inner circumference of the cyclorama ring; (3) placing the cyclorama presentation graphic object at the correct placement location to fill in the next spot around the cyclorama ring; (4) assigning the texture with the inner surface of the cyclorama graphic object. This cycle is performed for each texture constituting the presentation. When the placement of all the cyclorama graphic objects is complete, the cyclorama graphic object at the home position is expanded inwardly into the cyclorama's enclosed space. This cyclorama graphic object is the start image of the presentation.

At block 607, the presentation owner can begin making the presentation as shown in FIG. 3. If the presentation owner wishes to present using an avatar in a traditional audience-facing position next to the expanded graphic object, the owner can open the mini-panel 321 as shown at 607 and in FIG. 3. Thereafter, the owner is free to provide an oral presentation, usually supporting or supplementing the current image on the expanded presentation graphic object at the home position. When the owner needs to move to another information image, the owner will touch one of the control buttons on the heads-up display of FIG. 3, or touch the desired cyclorama graphic object directly, or issue a command on a chat channel as later herein described. All of these actions cause the cyclorama presentation graphic object at the home position to contract, after which the entire cyclorama, carrying all cyclorama graphic objects, rotates so that the selected cyclorama graphic object is moved to the home position, after which the selected cyclorama graphic object is expanded as shown at 315 in FIG. 3.

At the completion of the oral presentation, a question-and-answer session may be desired by the presenter. In an alternative embodiment of the instant invention, the owner can set the cyclorama into a mode that allows transmission of audience members' selection of a cyclorama graphic object to place in the home position, as previously described. This feedback mode is enabled via a heads-up display button or command, as later described and is displayed to the presentation owner on display 301 of the presentation owner.

Further, the presentation owner may wish to get a show of hands for each of a number of options that have been presented in particular images. In an alternative embodiment of the instant invention, the feedback function 609 is opened by selecting the feedback mode selection button 319 on the presentation owner's heads-up display or by an equivalent chat command to collect audience member inputs. Audience users respond, in one embodiment of the invention, by touching cyclorama graphic objects or other complex graphic objects resolved during the course of a presentation. The feedback function at block 611 tabulates the multiple audience users' inputs and delivers them to the presentation owner in one of several possible ways. For example, the responses cast for each presented information image can be displayed as a number adjacent to the cyclorama graphic objects for all to see, or they can be delivered as a list to the presentation owner. At block 613 feedback is deactivated.

FIG. 7 shows the interactions that implement the method of the invention in its Second Life™ embodiment across the network of computers involved. The presentation owner 329 is shown at the left of FIG. 7, indicating the owner's input at a client computer; and the cyclorama handler 711 is shown at the right in the server computer. The resolve input 705 and the ready response 707 move in the network to place the cyclorama into the 3D virtual world environment of Second Life™. Once resolved, the owner initiates resolving of cyclorama presentation graphic objects 713 by touching the cyclorama ring. The re-entrant cyclorama handler 715 resolves a cyclorama presentation graphic object to be conjoined to the increasingly complex cyclorama ring object. At 719, the angle, radius, position, and texture are sent to the cyclorama graphic handler object 721. At 723 the graphic cyclorama presentation graphic object is in view on the client computer display screens. The interactions in that portion of FIG. 7 containing 715, 719, and 721 occur over and over, once for each texture to be rendered as a part of the presentation.

The remaining portions of FIG. 7 show how the system of the invention operates after the cyclorama has been resolved and populated with cyclorama graphic objects with their respective information images. When the presentation owner touches one of the cyclorama graphic objects at 725, a message is passed from the touched object to the re-entrant cyclorama handler 727. The message is acted upon by the cyclorama handler by sending contract message 729 to the cyclorama graphic object handler 731 in the cyclorama presentation graphic object at the home position. Then the cyclorama, carrying all cyclorama graphic objects, rotates to place the touched cyclorama graphic object at home position to become the presentation graphic object. Then the cyclorama handler sends expand message 733 to the cyclorama graphic object handler 731 to expand the touched object for audience viewing at 735. The touched expanded cyclorama presentation graphic object is displayed at the home position on all client computer display screens.

Alternately the presentation owner may press one of the next, previous, and start buttons displayed on the owner's client computer display screen at 737, causing the heads-up display handler 739 to generate a command message 741 on a chat message channel known between 739 and re-entrant cyclorama handler 727. Again the message is acted upon by the cyclorama handler 727, by sending contract message 729 to the cyclorama graphic object handler 731 in the cyclorama presentation graphic object at the home position. Then the cyclorama, carrying all cyclorama graphic objects, rotates to place the touched cyclorama graphic object at home position. Then the cyclorama handler sends expand message 733 to the cyclorama graphic object handler 731 to expand the touched object for audience viewing at 735. The touched expanded cyclorama presentation graphic object is displayed at the home position on all client computer display screens.

The remaining interactions show how chat commands, described in detail below, can be used to control the cyclorama during a presentation by the owner to an audience. At 743, a local chat command is sent to cyclorama handler 745 on the known cyclorama chat channel. The re-entrant cyclorama handler 745 controls the cyclorama presentation graphic object handler 749 by sending any required messages 747 to perform the commanded function, which function has completed at 751. Alternately the presentation owner can send a local chat command 753 on the known chat channel to the cyclorama presentation graphic object handlers 755. The cyclorama presentation graphic object handlers perform the commanded function, which has completed at 757.

FIG. 8 comprises FIGS. 8A and 8B as shown on drawing sheet 8. FIGS. 8A and 8B describe blocks 601, 603, and 605 of FIG. 6 in more detail. The presentation owner's deployment of the presenter object tool in the virtual 3D environment is shown at 801 in the flow diagram in FIG. 8A. At 803 the dependent scripts are reset to their default state. At 805 the number of graphic objects needed to carry the images is calculated. At 807 the cyclorama handler 711 is placed in listen mode while it continues to perform the checks described below. As the presenter object tool resolves, it performs checks at 809 for whether it will be allowed to generate cyclorama graphic objects and at 813 whether there is a sufficient number of graphic objects available, in its deployed location, for the cyclorama to resolve a sufficient number of graphic objects for showing the entirety of the presentation contents. The heads-up-display 327 is offered at block 817 to the presentation owner. At 819 the cyclorama handler enters listen mode to accept presentation owner input.

Control then passes to the state entry handler 827 of the invention as shown in FIG. 8A. At 821 the initial rotation of the presenter object tool is captured. At 823 the rotation increment is calculated to allow placement of all cyclorama graphic objects at the proper positions around the inner perimeter of the presenter object tool. Permissions to change linking are checked at 825.

In FIG. 8B, the object change handler 837 then calculates and stores at 829 the path from a central resolution location in enclosed space 314 to a placement location of the graphic object to the inner perimeter of 313. 831 resolves the graphic object, block 833 links the graphic object to the presenter object tool, and the code in block 835 initiates the graphic object size inquiry. Message handler 839 then responds to receipt of the size inquiry response by checking at 841 that the link message is from a cyclorama graphic object and at 845 that the response format is valid. If either result is NO, control is transferred to error handling states 843 and 847 respectively. If the answers are YES, the correct graphic object size is calculated and stored at 849 and the correct linear displacement is re-calculated and stored at 851, after which the graphic object is moved to its presentation placement location. Thereafter this method is repeated by returning to the object change handler 837 for the next graphic object, and the cycle repeats until all graphic objects are resolved and placed. After the graphic objects have been resolved and placed in the cyclorama, the cyclorama handler is again placed in listen mode at 855 to receive the inputs from the presentation owner to control the sequencing of the presentation.

After the cyclorama has been resolved and populated, it can be taken back into inventory and then later resolved again in another location in Second Life™.

In this embodiment of the invention in Second Life™, permissions are important when placing textures in the presenter object tool's contents. It is advantageous to specify copy, modify, and transfer permissions and are Share with Group enabled for all textures placed in the contents of the cyclorama. To change the permissions on textures, select all the textures whose properties need to be changed, via Shift+click or Ctrl+click multiple selection methods. Then right-click over any selected texture, and select Properties. For each texture, select Share With Group and all three next-owner permissions of Copy, Modify, and Resell/Give away. Finally close the inner properties window so as to move on to the next texture.

Having resolved the cylindrical 3D virtual presentation environment, populated the environment by placing the information to be presented onto virtual 3D graphic object surfaces of the cylindrical 3D virtual presentation environment, and returned control to a virtual 3D application program, which in this embodiment is Second Life™ running in client computers for interaction with users and the presentation owner to present the information to be presented, the presentation system of the invention is ready for operation in presenting information subject matter to a widely-dispersed user audience in the computer implemented virtual 3D environment.

The cyclorama can be controlled directly via commands in the local chat, as provided by the underlying virtual world's functions and capabilities. The commands of NEXT, PREVIOUS, and START have already been described, and they operate in the same manner as described for the same-named selections on the heads-up display. The following commands are examples of many that are possible in the instant invention.

A command of SLIDE with a parameter of SLIDE-NUMBER, moves the cyclorama to immediately make the designated SLIDE-NUMBER the current image 315. SLIDE-NUMBER is a zero-based cardinal value, meaning that the first slide is numbered zero.

A command CHANNEL with a parameter of the CHANNEL-NUMBER, changes the cyclorama's listening channel number to CHANNEL-NUMBER, and then changes all the cyclorama graphic objects' channel numbers to (CHANNEL-NUMBER+1).

A command RESET deletes all cyclorama graphic objects from the cyclorama.

In one embodiment, the cyclorama graphic objects also listen for commands from local chat on the next (more positive) sequential channel from that of the cyclorama ring object, giving the cyclorama graphic objects the ability to respond to commands independently from the cyclorama ring. The following commands are examples of many that are possible in the instant invention.

A command of EXPAND makes the cyclorama graphic object grow to its home position size, as shown by 315 in FIG. 4, so that nearby audience users, as represented by their avatars, can easily view the information image on the cyclorama graphic object.

A command of CONTRACT makes the cyclorama graphic object shrink to its default size and position around the inner perimeter of the cyclorama, as shown by 335 and 337 in FIG. 3.

A command of RADIUS with a parameter of FLOAT-VALUE stores the FLOAT-VALUE as the displacement for the cyclorama graphic object.

A command of ANGLE with a parameter of FLOAT-VALUE stores the FLOAT-VALUE as the local rotational angle of the cyclorama graphic object.

A command of POSITION places the cyclorama graphic object, in the local coordinate system of the cyclorama ring, according to the previously stored values from RADIUS and ANGLE commands.

A command of TEXTURE with a parameter supplying access to the texture to be placed causes the inner display surface of the cyclorama graphic object to present the texture.

A command of CHANNEL with the parameter of CHANNEL-NUMBER changes the cyclorama graphic object's listening channel number to CHANNEL-NUMBER.

Having described the system, apparatus, and method of the invention, it will be understood by those skilled in the art of computer systems that many additional modifications and adaptations to the present invention can be made in both embodiment and application without departing from the spirit of this invention. For example, although the invention has been described with respect to embodiment in Second Life™ for certain sales and lecture applications, it will be understood that the invention is applicable in other virtual 3D environment application programs and for other uses such as business meetings, political assemblies, and anywhere that information is to be presented to a remote audience, potentially widely dispersed, via a computer network.

Accordingly, this description should be considered as illustrative of the present invention, which provides for improved presentation in computer network virtual 3D environments, allowing body language feedback as well as audience participation by providing feedback on presented concepts embodied in the presented information including that which is in the images presented as graphic objects, and not in limitation thereof.

What is claimed is:

1. A system for presenting information to audience users in a computer network implemented virtual 3D environment comprising:
   a server computer;
   a virtual 3D environment computer application running in the server computer;
   a presenter object tool running within the virtual 3D environment computer application for use by a presentation owner in creating and presenting information to the audience users, the presenter object tool assisting a presentation owner in creating a virtual 3D presentation environment of graphic objects, wherein each graphic object comprises a 3D object within the virtual 3D environment with at least one surface, the presenter object tool assisting a presentation owner in placing the information to be presented with the graphic objects as image textures on surfaces of the graphic objects; and logic in the presenter object tool for controlling motion of the graphic objects around an audience of users within the virtual 3D environment to sequence a presentation of the presentation information displayed.

2. The system of claim 1 wherein the logic in the presenter object tool expands and contracts size of the graphic objects within the virtual 3D environment as the graphic objects are rotated about an audience of users represented by avatars occupying the space inside a virtual 3D cyclorama environment during a presentation.

3. The system of claim 1 wherein:
the graphic objects have at least one substantially planar surface for receiving the information to be presented and, when a graphic object of the graphic objects is placed in a placement location, the planar surface is facing inward in the virtual 3D presentation environment.

4. The system of claim 3 wherein:
the presenter object tool expands the planar surface of a graphic object of the graphic objects at a presentation location to a larger size.

5. The system of claim 1 wherein:
the presenter object tool provides a heads up display of next, previous, and start buttons for display on the presentation owner's computer display and use by the presentation owner to control the motion of the graphic objects around the audience of users.

6. The system of claim 5 wherein the heads up display further comprises:
A mini-view button for selection by a presentation owner to cause a copy of the information currently being presented with the graphic object as an image texture on a surface of the graphic object at the presentation location to appear on a mini-view panel associated with the heads up display.

7. The system of claim 6, wherein:
positioning a cursor at a location on the copy of the information currently being presented appearing on the mini-view panel associated with the heads up display causes the cursor to appear at the corresponding location of the information currently being presented with the graphic object as an image texture on a surface of the graphic object.

8. The system of claim 5 wherein:
selection of the next button causes:
an expanded graphic object at a presentation location to contract to a smaller size, the graphic objects to increment one position, and a next adjacent graphic object to expand to a larger size at the presentation location;
selection of the previous button causes;
an expanded graphic object at a presentation location to contract to a smaller size,
the graphic objects to decrement one position, and a previous adjacent graphic object to expand to a larger size at the presentation location;
selection of the start button causes:
an expanded graphic object at the presentation location to contract to a smaller size, the graphic objects to move as many positions as necessary to place a start graphic object at the presentation location and to expand to a larger size at the presentation location.

9. The system of claim 1 wherein the presenter object tool is responsive to a selection of a graphic object by the presentation owner to cause an expanded graphic object at the presentation location to contract to a smaller size, and the graphic objects to move as many positions as necessary to place the selected graphic object at the presentation location and to expand to a larger size at the presentation location.

10. The system of claim 1 wherein the virtual 3D environment computer application comprises:
an avatar representing the presentation owner and an avatar representing each audience user for providing feedback to the presentation owner and to audience users regarding attention of the presentation owner and audience users to specific graphic objects.

11. The system of claim 1, wherein the virtual 3D cyclorama environment encircles the audience of users represented by avatars with the graphic objects, such that at least one graphic object is larger than each other graphic object of the graphic objects within the virtual 3D environment, and wherein each of the graphic objects are placed at equal angular displacement around the virtual 3D cyclorama environment.

12. A method for presenting information to audience users in a computer implemented virtual 3D environment comprising:
selecting and placing a defined virtual 3D cyclorama environment into the virtual 3D environment;
selecting and placing information to be presented onto a surface of at least three defined graphic objects, wherein each of the graphic objects comprises a 3D object within the virtual 3D environment;
selecting and placing the defined graphic objects into the defined virtual 3D cyclorama environment;
selecting one of the graphic objects as a presentation graphic object being presented at a home position in the virtual cyclorama environment by:
selecting one of:
a next sequential graphic object of the graphic objects,
a previous sequential graphic object of the graphic objects, and
a start graphic object of the sequence of graphic objects;
moving the graphic objects of the virtual 3D cyclorama environment around the audience of users to move the selected graphic object into the home position; and
enlarging, within the virtual 3D environment, at least the surface of the selected one of the graphic objects at the home position for viewing by audience users.

13. The method of claim 12 wherein selecting one of the graphic objects as a presentation graphic object being presented at a home position in the virtual cyclorama environment further comprises:
rotating the entire cyclorama and rotating the graphic objects, so that the selected graphic object is moved to the home position.

14. The method of 12 where avatars represent participants to a presentation further comprising:
placing complex graphic objects accompanying the presentation information into a midst of the avatars representing the audience users.

15. The method of claim 12 wherein the defined virtual 3D cyclorama environment comprises a cyclorama presentation wall that is translucent and the selecting and placing a defined virtual 3D cyclorama environment into the virtual 3D environment further comprises:

placing the defined virtual 3D cyclorama environment into an existing defined virtual 3D environment so that the cyclorama environment includes graphic objects within and outside of the cyclorama presentation wall.

16. The method of claim 12 further comprising:

activating audience feedback logic to allow transmission of an audience user's selection of a graphic object to the presentation owner.

17. The method of claim 16 wherein activating audience feedback logic further comprises:

displaying an audience user's selection to the presentation owner.

18. The method of claim 17 wherein displaying an audience user's selection further comprises:

displaying selections of multiple audience users to the presentation owner.

19. The method of claim 16 wherein activating audience feedback logic further comprises:

deactivating audience feedback.

20. A computer program product for assisting a presentation owner in creating and presenting information to audience users in a computer network implemented virtual 3D environment, the computer program product comprising:

a computer readable hardware storage medium having computer readable program code embodied therewith, the computer readable program code comprising:

computer readable program code providing a virtual 3D cyclorama presentation environment of virtual graphic objects, wherein each of the virtual graphic objects comprises a 3D object within the virtual 3D environment; and computer readable program code for receiving information to be presented and placing the information to be presented onto a surface of at least three of the virtual graphic objects;

computer readable program code for responding to selection of one of the virtual graphic objects to move the selected one of the virtual graphic objects to a home position; and expanding the selected one of the graphic objects for viewing by an audience user;

computer readable program code for responding to selection of one of:

a next sequential graphic object of the graphic objects;

a previous sequential graphic object of the graphic objects;

a start graphic object of the sequence of graphic objects; and computer readable program code for rotating the graphic objects around the audience of users at a perimeter of the virtual 3D cyclorama presentation environment to place the selected graphic object into the home position.

* * * * *